G. E. CHANDLEE.
ARTIFICIAL FLOWER.
APPLICATION FILED NOV. 17, 1909.

989,693.

Patented Apr. 18, 1911.

Inventor
Grace E. Chandlee.

Witnesses
O. E. Johansen
M. L. Lowy

By Woodward & Chandlee
Attorneys

UNITED STATES PATENT OFFICE.

GRACE E. CHANDLEE, OF WASHINGTON, DISTRICT OF COLUMBIA.

ARTIFICIAL FLOWER.

989,693.  Specification of Letters Patent.  Patented Apr. 18, 1911.

Application filed November 17, 1909. Serial No. 528,602.

*To all whom it may concern:*

Be it known that I, GRACE E. CHANDLEE, a citizen of the United States, residing at Washington, in the District of Columbia, have invented certain new and useful Improvements in Artificial Flowers, of which the following is a specification.

This invention relates to improvements in artificial plants and especially artificial flowers, and consists essentially in an artificial plant element comprising two pieces of fabric having certain transverse dimensions unequal and united at both ends of their said unequal dimensions; the invention further consisting in the details of construction and the arrangement of devices hereinafter described and specifically pointed out in the claims; the object of the invention being to effect improvements in the construction of the elements, such as petals, of an artificial flower or the like, whereby a flower or the like plant element is produced which is exceedingly beautiful and effective and closely simulates the natural flower.

Figure 1:
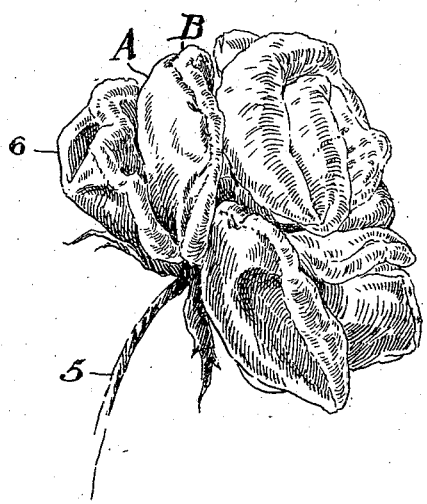
Figure 4:
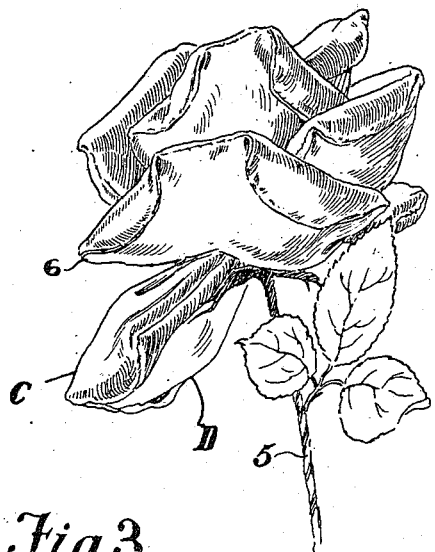
Figure 2:
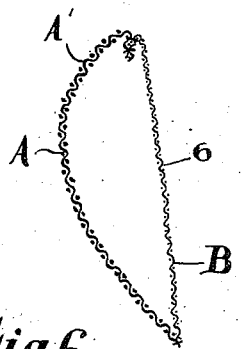
Figure 3:
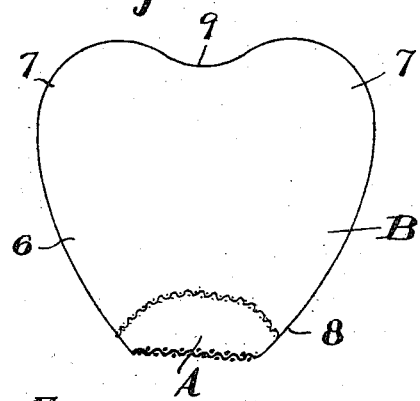
Figure 6:
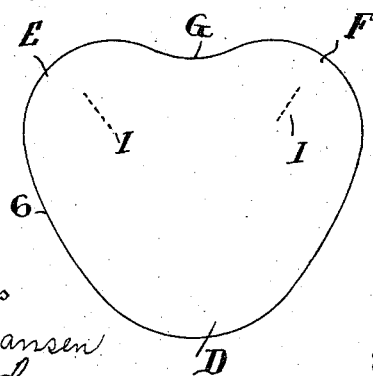
Figure 5:
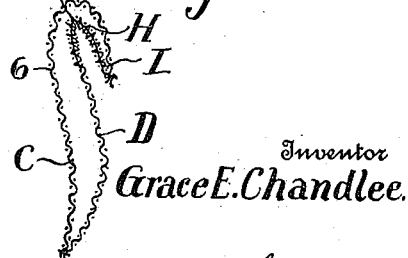

In the accompanying drawings forming part of this specification:—Figure 1 is a perspecive view of a form of artificial rose, simulating the common garden rose, constructed in accordance with my invention. Fig. 2 is a sectional view of one of the petals of the same, showing two thicknesses of fabric of unequal transverse dimensions constituting the same united at both ends of their unequal transverse dimensions. Fig. 3 is an elevation of one of the petals in a completed state. Fig. 4 is a perspective view of an artificial flower constructed in accordance with my invention, and simulating a highly cultivated rose such as a hot-house rose. Fig. 5 is a detail sectional view through one of the petals of the rose shown in Fig. 4, and showing one of the gathers by means of which the outer portion of the petal is turned back or incurved. Fig. 6 is a detail and plan of the same petal.

In accordance with my invention, an artificial flower or other artificial plant element may be produced, and I do not desire to limit myself in this particular. For the purposes of this specification, I show and hereinafter describe artificial roses as artificial plant elements constructed in accordance with my invention. In constructing a petal or other element of an artificial flower or other artificial plant member or element in accordance with my invention, I employ two thicknesses or pieces of fabric A and B which are appropriately shaped and which have certain transverse dimensions unequal. For forming the petal of an artificial rose simulating a garden rose as illustrated in Fig. 1, I preferably employ satin or other relatively stiff material for the outer side A of the petal and chiffon or other relatively thin and limp material for the inner side B of the petal. These fabrics are cut in approximately heart shape as shown in Fig. 3 with the inner fabric B shorter than, or in other words, unequal in transverse dimension to the outer fabric A and the two fabrics are united together on their edges, as by means of stitching, the effect being that the fabric B will be put under tension to some extent by the outer fabric A, and hence the latter will be bowed. The outer fabric may be shaped by manipulation with the fingers as desired and required to simulate the appearance of a petal when viewed from without. Usually the extremities of the fabrics A—B at the inner end of the petal will be gathered and tied, but they may be otherwise secured within the scope of my invention as defined in the claims, the distinguishing feature of my invention being the production of an artificial plant element comprising two thicknesses of fabric having certain transverse dimensions unequal and united together at both ends of their said unequal dimensions.

The bowed disposition of the outer fabric A, indicated at A′ in Fig. 2, by reason of said fabric being of greater length in one transverse dimension than the inner fabric B to which it is united, gives the petal 6 a curvature such as found in the natural rose. The fact that the inner fabric B is relatively thin and almost transparent and the outer fabric A is relatively thick and of considerable body is not apparent except upon close examination, and the effect produced is very pleasing. The petals are shaped as required and are assembled in the customary way and secured at their inner ends to a stem 5 to which leaves may be also attached as indicated.

In making the form of rose shown in Fig. 4 and simulating a highly cultivated or hot-house rose in which the petals are more pointed than in the form of rose shown in Fig. 1, each petal is made of two pieces of fabric C and D respectively, which are appropriately shaped as indicated in Fig. 6 and are preferably of the same material, usually that form of silk or satin known as messaline, which while soft and pliable yet produces a certain degree of stiffness. In this form of flower likewise, the inner fabric C and outer fabric D are unequal in certain transverse dimensions and their edges are united together, as by means of stitching. The fabrics are shown as heart shaped to produce enlarged outer corner portions E and F, and the intervening recessed portion G corresponding to the recess or depression 9 in the first described form of the rose. To produce the required curled-over effect at the outer corner portions of the petals, the outer fabric D is gathered as shown at H in its corner portions E and F by means of threads run through the said fabric as indicated at I. Thus, these corner portions are caused to contract and the corner portions of the other fabric are correspondingly curved over outwardly as illustrated in the drawing. These corner portions may be tacked in their turned over positions, the threads of such tacking passing only through the outer fabric and hence being concealed from view. While I have preferably formed the petals of this form of rose of two fabrics of the same material, different kinds of fabric may be used within the scope of my invention, and the backward curl of the petal of the form of rose shown in Fig. 4 may be produced in the same manner as the forward curl of petal in the form of rose shown in Fig. 1. I do not limit myself as to these particulars.

In the form of rose shown in Fig. 4, the curling of the petals produces a sharp bend indicated at H' in the outer piece of fabric D (Fig. 5) and the inner fabric has a smooth curvature over this bend, this effect being attainable only through the use of the two pieces of fabric.

Having thus described my invention, what I claim is:—

1. An artificial plant element comprising two fabrics having certain corresponding dimensions unequal, said fabrics being united at both ends of their unequal dimensions with the fabric having the longer dimension, bowed.

2. An artificial plant element comprising a pair of fabrics united together at their edges, one of the said fabrics having gathers therein reducing a dimension thereof as compared with a similar dimension of the other fabric.

3. An artificial plant element comprising an inner and an outer fabric united together at their edges, and one unequal in certain transverse dimensions to corresponding dimensions in the other, and provided with gathers which cause one edge of the said element to curl.

In testimony whereof I affix my signature, in presence of two witnesses.

GRACE E. CHANDLEE.

Witnesses:
  EDGAR A. MILLER,
  WM. K. ELLIS.